(12) United States Patent
Craske

(10) Patent No.: US 9,753,730 B2
(45) Date of Patent: Sep. 5, 2017

(54) DECODING INSTRUCTIONS FROM MULTIPLE INSTRUCTIONS SETS

(75) Inventor: Simon John Craske, Cambridge (GB)

(73) Assignee: ARM Limited, Cambridge (GB)

( * ) Notice: Subject to any disclaimer, the term of this patent is extended or adjusted under 35 U.S.C. 154(b) by 1084 days.

(21) Appl. No.: 13/200,322

(22) Filed: Sep. 23, 2011

(65) Prior Publication Data

US 2012/0089818 A1 Apr. 12, 2012

(30) Foreign Application Priority Data

Oct. 12, 2010 (GB) .................................. 1017177.5

(51) Int. Cl.
*G06F 9/30* (2006.01)

(52) U.S. Cl.
CPC ................................ *G06F 9/30145* (2013.01)

(58) Field of Classification Search
CPC .................................................. G06F 9/30145
See application file for complete search history.

(56) References Cited

U.S. PATENT DOCUMENTS

| | | | |
|---|---|---|---|
| 5,925,124 A | 7/1999 | Hilgendorf et al. | |
| 6,014,735 A * | 1/2000 | Chennupaty et al. | 712/210 |
| 7,149,878 B1 * | 12/2006 | Jensen et al. | 712/209 |
| 2002/0004897 A1 | 1/2002 | Kao et al. | |
| 2005/0257028 A1 | 11/2005 | Guffens et al. | |
| 2009/0172356 A1 | 7/2009 | Valentine et al. | |
| 2009/0204785 A1 * | 8/2009 | Yates et al. | 711/205 |

FOREIGN PATENT DOCUMENTS

| | | |
|---|---|---|
| CN | 101627366 | 1/2010 |
| EP | 1 387 252 | 2/2004 |
| GB | 2 289 354 | 11/1995 |
| JP | H08-044557 | 2/1996 |
| JP | 2004-259143 | 9/2004 |
| JP | 2009-181312 | 8/2009 |
| JP | 2010-521748 | 6/2010 |
| TW | 477936 | 3/2002 |

(Continued)

OTHER PUBLICATIONS

Kastrup et al., "ConCISe: A Compiler Driven CPLD-Based Instruction Set Accelerator", Field-Programmable Custom Computing Machines, 1999. FCCM'99. Proceedings. Seventh Annual IEEE Symposium on. IEEE, 1999. pp. 1-10.*

(Continued)

*Primary Examiner* — John Lindlof
(74) *Attorney, Agent, or Firm* — Nixon & Vanderhye P.C.

(57) ABSTRACT

A data processing apparatus, method and computer program are described that are capable of decoding instructions from different instruction sets. The method comprising: receiving an instruction; if an operation code of said instruction is an operation code of an instruction from a base set of instructions decoding said instruction according to decode rules for said base set of instructions; and if said operation code of said instruction is an operation code of an instruction from at least one further set of instructions decoding said instruction according to a set of decode rules determined by an indicator value indicating which of said at least one further set of instructions is currently to be decoded.

22 Claims, 9 Drawing Sheets

(56) References Cited

FOREIGN PATENT DOCUMENTS

WO       WO 97/37300     10/1997
WO       WO 2008/113007   9/2008

OTHER PUBLICATIONS

International Preliminary Report on Patentability mailed Oct. 11, 2012 in PCT/GB2011/051848.
UK Search Report for GB Application No. 1017177.5, dated Feb. 21, 2011.
International Search Report and Written Opinion of the International Searching Authority mailed Dec. 23, 2011 in PCT/GB2011/051848.
English translation of Chinese Office Action dated Nov. 4, 2014 in CN 201180048887.6, 6 pages.
English translation of Chinese Second Office Action issued Jun. 23, 2015 in CN 201180048887.6, 5 pages.
English translation of Japanese Office Action issued Apr. 28, 2015 in JP 2013-533281, 6 pages.
M. Mori, "Hajimeteno Kumikomi Puroguramingu Dai 2 Kai Warikomi" (Built-in Programming for Beginners, No. 2, Interrupt), C Magazine, Softbank Publishing Co., Ltd. (currently SB Creative Corp.), Sep. 1, 1999, vol. 11, No. 9, pp. 65-69.
T. Kobayashi, "Arm Meirei Setto No Shousai" (Details of ARM command sets), Interface, CQ Publishing Co., Ltd., Nov. 1, 2002, vol. 28, No. 11, pp. 76-86.
English translation of Taiwanese Office Action issued Feb. 13, 2015 in TW 100133629, 7 pages.
English translation of Korean Office Action issued Feb. 20, 2017 in KR 10-2013-7009938, 2 pages.
English translation of Chinese Third Office Action issued Dec. 17, 2015 in CN 201180048887.6, 5 pages.

* cited by examiner

Func 1: ADD
    SUB
    BL Func2 < LR.MSB = ISA0, ISASEL=0> link register

Func 2 ISA#3<ISASEL=3>
———
———
———
BL FUNC3 link register

FunC3  ADD<ISASEL=0>

ISA#4<ISASEL=4>
———
———
———
RET <ISASEL=LR.MSB>

DECODING INSTRUCTIONS FROM MULTIPLE INSTRUCTIONS SETS

BACKGROUND OF THE INVENTION

Field of the Invention

The present invention relates to the field of data processing and in particular to the decoding of instructions from different instruction sets.

Description of the Prior Art

Processors that can use instructions from different instruction sets are known. ARM® of Cambridge UK for example have processors that use an ARM instruction set and a thumb instruction set, thumb instructions being 16 bits wide and ARM instructions being 32 bits wide. In order for a decoder to know which instruction set is being used a free bit in the encoding of the instruction is used to indicate whether the instruction is an ARM or thumb instruction.

In some processor architectures there are a set of encodings that define instructions explicitly supported by the architecture and there are a set of free encodings that are available for users of the architecture to define their own instructions. In processor architectures that provide an encoding space available for users to define their own instructions, having a bit of an instruction encoding that is used to specify a particular instruction set raises its own problems.

It would be desirable to be able to provide a plurality of instructions sets without unduly increasing the encoding space and while allowing the possibility of users to define their own instructions.

SUMMARY OF THE INVENTION

Viewed from a first aspect, the present invention provides a data processing apparatus comprising: an instruction decoder for decoding instructions; and a processor for processing data in response to instructions decoded by said instruction decoder; said instruction decoder being configured to decode instructions from a plurality of different instruction sets, said instruction sets including a base instruction set and at least one further instruction set; said base instruction set comprising a plurality of instructions each instruction comprising a predefined operation code for uniquely identifying said instruction, and said at least one further instruction set comprising a plurality of instructions, each instruction comprising an operation code for identifying said instruction within said at least one further instruction set; said instruction decoder being configured to decode an instruction having one of said plurality of predefined operation codes according to a base set of decode rules; and to decode an instruction having one of said operation codes of said at least one further instruction set, according to a set of decode rules determined by an indicator value indicating which of said at least one further set of instructions is currently to be decoded.

The present invention recognises that it is advantageous to provide an encoding space in which users can define their own instructions but it also recognises that it is advantageous if there is a base set of instructions that can always be decoded.

It addresses these competing requirements by providing a base set of instructions that an instruction decoder decodes according to a base set of rules and at least one further instruction set that the decoder decodes according to a set of rules determined by an indicator value.

In this way, by the simple use of an indicator value a number of different instructions sets that are decoded by different rules can be provided. This means that the same encodings can be used to define different instructions according to the instruction set chosen and indicated by the indicator value. In this way, users of the system can define their own instructions and these can have decoding rules which the indicator value will trigger the use of.

By providing the base set of instructions such that they can always be decoded and further instructions that can be decoded where the indicator bit is appropriately set, the advantages of having instructions that are always defined and the possibility of having a very large number of further instructions is provided without unduly increasing the encoding space.

In some embodiments, said instruction decoder is configured to decode at least two further instruction sets, said at least two further instruction sets having at least some operation codes in common.

It is advantageous if the encoding space for the further instruction sets is shared such that operation codes for instructions in the different instruction sets are the same but map to different instructions. This is an effective use of the encoding space and means that by the use of the indicator value a large number of different instructions can be defined.

In some embodiments, said data processing apparatus comprises a status register for storing said indicator value.

Although, the indicator value can be stored in a number of places, in some embodiments it is stored in a status register. This is a convenient place to store it and allows it to be set and read easily.

In some embodiments, said instruction decoder is responsive to an instruction set update instruction to set said indicator value stored in said status register to a value specified in said instruction, said instruction set update instruction being an instruction from said base set of instructions.

The indicator value may be updated by an instruction set update instruction. In this way, a programmer that wishes to use a particular set of instructions can simply update the indicator value to indicate this set of instructions and thereafter, the decoder will decode instructions in the decoding space of the further instruction set according to the decoding rules indicated by the indicator value. When a new set of instructions is required then the instruction set update instruction is simply used again to change the indicator value to indicate the newly required instruction set.

In some embodiments, said processor is configured in response to a branch instruction indicating said program stream is to branch to store a return address and said indicator value such that on return from said branch said return address and indicator value can be restored.

A potential problem may arise where a program branches to a subroutine as this subroutine may use a different further instruction set. In order to address this problem, in addition to storing the return address indicating the address of the next instruction that the program should return to after the branch has completed, the current indicator value is also stored so that if the indicator value is changed during the subroutine then it is reset to its initial value when the program returns from the subroutine.

In some embodiments, said data processing apparatus is configured to reset said indicator value prior to said branch.

Although, the indicator value may remain unchanged at a branch, in some embodiments the data processing apparatus is configured to reset it prior to the branch. The subroutine may well not use the further instruction set that is being used when the program branches and it may be convenient to reset the indicator value before branching. However, it may also be convenient to leave it as it is, as the base set of instructions can still be decoded and if a different further instruction set is required then the indicator value will need to be reset in any case.

In some embodiments, said return address and indicator value are stored in a same link register.

One way of storing the return address and the indicator value are to store them in a link register. In embodiments of the invention, the link register is wide enough to store both the indicator value and the return address and thus, this is an efficient and effective way of storing these two values in a position that is easy to access.

In some embodiments, said more significant bits of said link register store said indicator value and said lower significant bits said return address.

The most significant bits of the link register may not be required to store the return address and thus, they can conveniently be used to store the indicator value.

In other embodiments, said return address and indicator value are stored to a stack in response to said branch and are read from said stack on return from said branch.

The return address and indicator value may be pushed out the stack in response to a branch if the embodiment does not use a link register. In such a case, on return from the branch they will be read back from the stack.

In some embodiments said instruction decoder is responsive to said indicator indicating one of said at least one further instruction set and to receipt of an instruction having an operation code for which there is no decode rule within said at least one further instruction set to generate an exception.

A data processing apparatus may be set up to trap for indicator values specifying instruction sets in which there are operation codes having no decode rule. In such a case, an exception is generated and a processing apparatus can then determine why there is an operation code specified by the instruction for which there is no decode rule.

In some embodiments, said instruction decoder is responsive to detecting said indicator value transitioning to a value indicating a further instruction set for which said instruction decoder has no decode rules to generate an exception.

Alternatively and/or additionally data processing apparatus may be set up to determine when indicator values transition to values for which the instruction decoder has no decode rules. In such a case, an exception is generated and again the processor determines why this error has arisen.

In some embodiments, said predefined operation codes for instructions within said base set of instructions lie within a predetermined base encoding space and said operation codes of said at least one further instruction set lie within a predetermined extension encoding space.

The use of both instruction sets and further instruction sets can be conveniently encoded by using a base encoding space for the base instruction sets and a further encoding space that is used to encode the plurality of further instruction sets. In this way, any operation code from the further instruction space can be used to specify a particular instruction depending which instruction set it is within. The instruction set it is within is indicated by the indicator value and this indicator value will trigger the decoder to use the appropriate set of decoding rules.

In some embodiments, a plurality of different indicator values identify one of said at least one further instruction set.

Although in some embodiments there may be a single indicator value to identify an instruction set, in other embodiments there may be a number of different ones. For example, if a processor supports negative addresses, then it may be convenient if an instruction set indicated by a 2 can be indicated by either 2 or a −2 depending on whether the negative addresses or positive addresses are being currently supported.

A second aspect of the present invention provides a method of decoding instructions from different instruction sets, comprising: receiving an instruction; if an operation code of said instruction is an operation code of an instruction from a base set of instructions decoding said instruction according to decode rules for said base set of instructions; and if said operation code of said instruction is an operation code of an instruction from at least one further set of instructions decoding said instruction according to a set of decode rules determined by an indicator value indicating which of said at least one further set of instructions is currently to be decoded.

A third aspect of the present invention provides, a virtual machine provided by a computer program executing upon a data processing apparatus, said virtual machine providing an instruction execution environment according to the data processing apparatus according to a first aspect of the present invention.

A fourth aspect of the present invention provides a computer program product comprising an instruction set update instruction which when run on a data processor controls said data processor to set an indicator value in a status register to a value indicated by said instruction set update instruction, a decoder of said data processor decoding instructions having operation codes indicating instructions from a base set of instructions according to a base set of decoding rules and decoding instructions having operation codes indicating instructions from a further set of instructions according to a set of decode rules determined by said indicator value.

A fifth aspect of the present invention provides a means for processing data comprising: an instruction decoding means for decoding instructions; and a processing means for processing data in response to instructions decoded by an instruction decoding means; said instruction decoding means being for decoding instructions from a plurality of different instruction sets, said instruction sets including a base instruction set and at least one further instruction set; said base instruction set comprising a plurality of instructions each instruction comprising a predefined operation code for uniquely identifying said instruction, and said at least one further instruction set comprising a plurality of instructions, each instruction comprising an operation code for identifying said instruction within said at least one further instruction set; said instruction decoding means being for decoding an instruction having one of said plurality of predefined operation codes according to a base set of decode rules; and for decoding instructions having one of said operation codes of said at least one further instruction set, according to a set of decode rules determined by an indicator value indicating which of said at least one further set of instructions is currently to be decoded.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
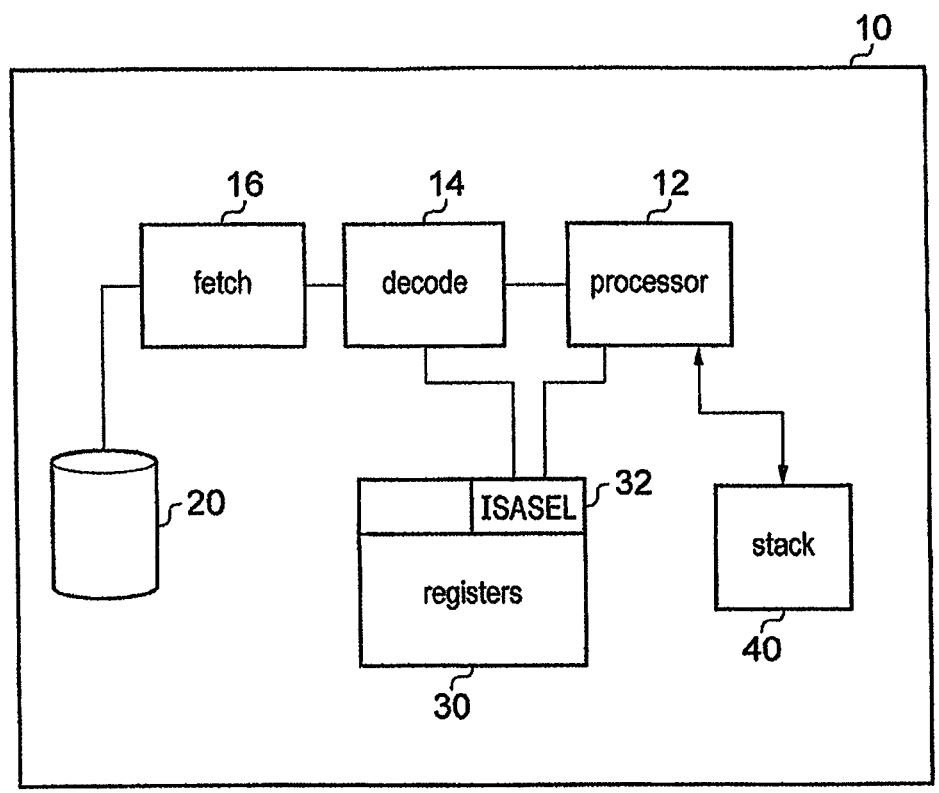
FIG. 1 shows a data processing apparatus according to an embodiment of the present invention.

FIG. 1 shows a data processing apparatus 10 having a processor 12. A program having instructions is stored in data store 20 and these instructions are fetched by fetch unit 16 and sent to decoder 14. Decoder 14 decodes the instructions and sends the decoded instructions to processor 12 for execution.

In this embodiment the decoder 14 is configured to decode instructions from a base set of instructions according to a base set of decoding rules and to decode instructions from one of a plurality of further sets of instructions according to decode rules specific to those particular sets of instructions. Thus, decoder 14 has access to an instruction set indicator value ISASEL stored in status register 32 within register bank 30 and to a plurality of decode rules related to the different indicator values. The indicator value indicates which set of further instructions is currently to be decoded by decoder 14 and in response to this value, the decoder chooses the appropriate decode rules for the instructions within the further instruction set encoding space and decodes them accordingly.

Data processing apparatus 10 also comprises a stack 40 which the processor uses to store return addresses and indicator values when branching as will be described with respect to later figures.

Figure 2:
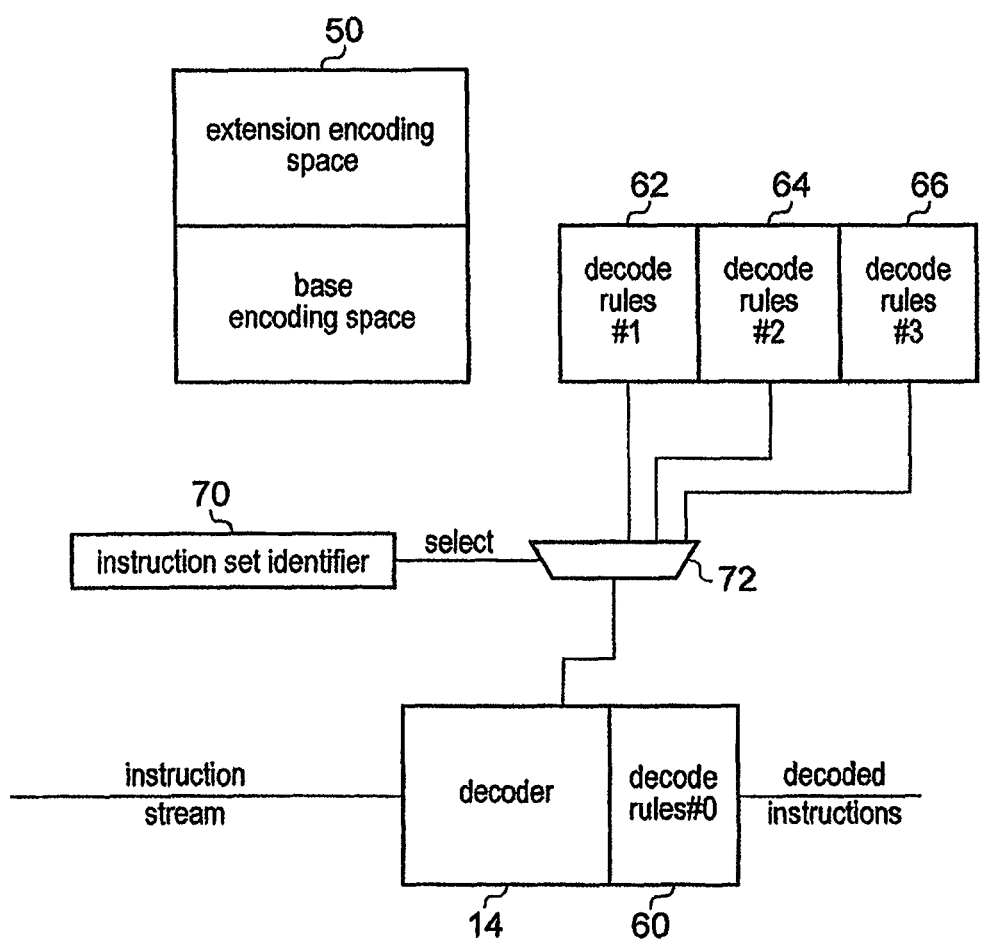
FIG. 2 schematically shows an instruction decoder and the decoding it uses according to an embodiment of the present invention.

FIG. 2 schematically shows a decoder 14 according to an embodiment of the present invention. The encoding space for the encodings of the instructions is schematically shown by block 50. This illustrates that there is a base encoding space which is used for the operation codes of the base set of instructions and there is an extension encoding space which is used for the operation codes of the further instruction sets. Thus, each further instruction set can use the whole extension encoding space for its operation codes.

This is made possible provided that an indication of which instruction set is currently being decoded is provided to the decoder so that any instructions that lie within the extension encoding space can be decoded according to the correct rules.

This is shown schematically in FIG. 2 by decoder 14 having the base decode rules 60 stored within it. These decode rules decode encodings within the base encoding space and the decoder always has access to these.

Other decode rules that relate to encodings within the extension encoding space are shown schematically in this diagram as 62, 64 and 66. Decoder 14 has access to these decode rules via multiplexer 72. A set of decode rules for use by decoder 14 are selected by multiplexer 72 in response to an instruction set identifier or indicator value 70 which is stored in status register 32 of FIG. 1. This identifier indicates which particular instruction set is currently being used and thus, which decode rules should be used for any instruction falling within the extension encoding space. In this way, a large number of different instructions can be encoded within a relatively small extension encoding space and provided the indicator value is appropriately set, they can be decoded by decoder 14. Furthermore, decoder 14 can always decode any instructions from the base instruction set.

Figure 3:
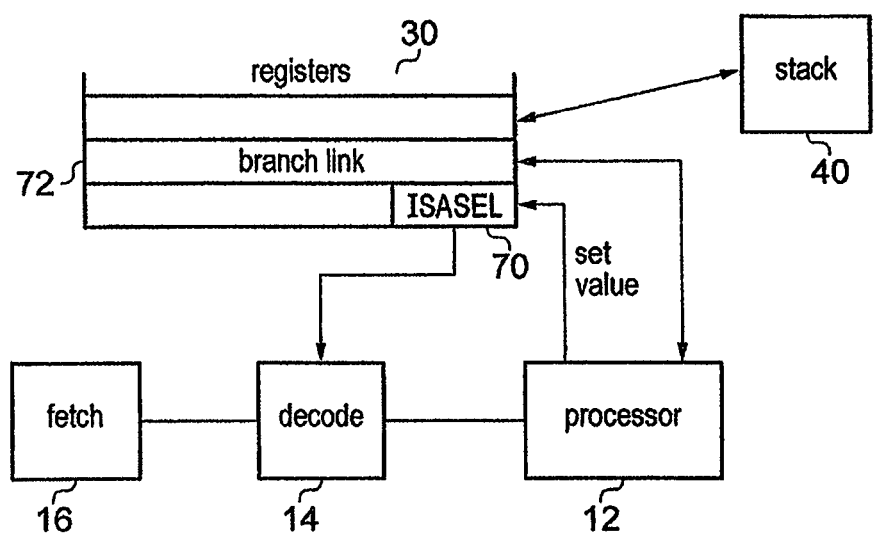
FIG. 3 schematically shows a processor decoder and registers according to an embodiment of the present invention.

FIG. 3 schematically shows a portion of data processing apparatus 10 according to an embodiment of the present invention. In this diagram one can see how the instruction set indicator value ISASEL is located within status register 70 and how processor 12 can set this value in response to an instruction set update instruction. Thus, in response to an instruction set update instruction the value indicated by this instruction is written into the status register 70. This value is then used by decoder 14 to select the decoding rules for instructions lying within the extension encoding space, this value indicating the further instruction set that they pertain to.

Register bank 30 also includes a branch link register 72 which is used to store the current instruction set indicator value and the return address when a program stream branches. When a program branches then it needs to be able to return to the original program stream and thus, a return address is always stored. However, as there are different instruction sets that can be decoded in embodiments of the invention, it is important that the current instruction set indicator value is stored when the program branches so that when the program returns to the original stream the decoder can use the correct decode rules. Thus, in addition to storing the return address the instruction set indicator value is also stored. Owing to the size of the branch link register and the size of the addresses there is conveniently enough space within the branch link register to store both the return address and the indicator value.

It should be noted, that in this embodiment there is only a single branch link register 72 and thus, if the program branches again the data within the register is written to stack 40 and the branch link register is then overwritten with the next return address and the instruction set indicator value current at the moment of the branch.

Figure 4:
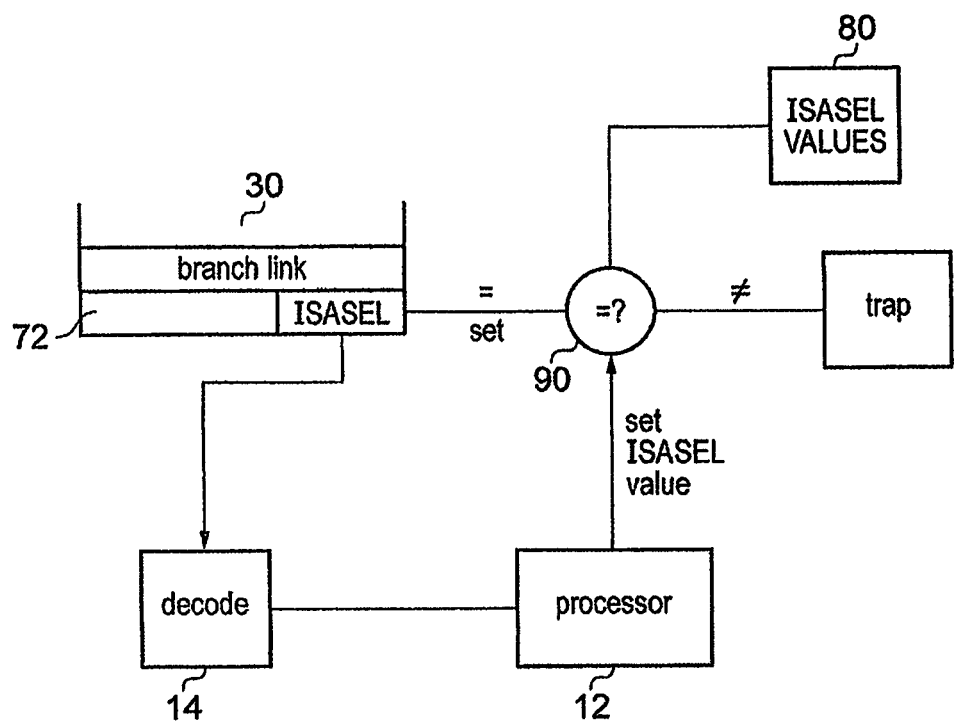
FIG. 4 schematically shows how an exception is generated in response to an invalid instruction set indicator value.

FIG. 4 shows a portion of data processing apparatus 10 and shows how an instruction set indicator value ISASEL that is not supported by the processor can be detected and generate a trap. Thus, in this embodiment in response to an instruction set update instruction processor 12 sends the new ISASEL value to register 72 to update the stored value. This new value passes through comparator 90 and is compared with a set of ISASEL values stored within store 80. Store 80 stores all possible instruction set values and thus, if there is not a match a non-match signal is sent by comparator 90 and this generates an exception. If there is a match then comparator 90 sends the indicator value to register 72 and a new value for the ISASEL is set.

Figure 5:
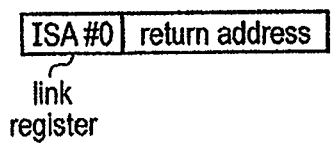
FIG. 5 schematically shows an instruction stream including branch instructions.
Figure 5:
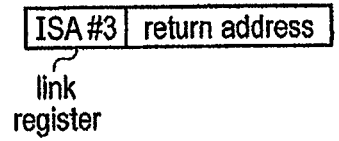

FIG. 5 schematically shows a stream of instructions being executed including branch instructions. Thus, in this embodiment there is a branch at function 2 and the link register stores the return address and the current instruction set indicator which in this case is a 0 indicating that no further instruction set is currently being supported. The subroutine that the branch jumps to is then executed and this subroutine sets the instruction set indicator value to 3 indicating that it wishes to use instructions from the further instruction set designated by indicator value 3. The instruction set then branches again and the link register is now updated to store the return address for this branch and the 3 indicator indicating that the instruction set indicator value should be reset to 3 when the program returns to this part of the instruction stream. It should be noted that in this embodiment there is only a single link register and thus, the value previously stored in the link register is pushed onto the stack prior to this link register being overwritten with the new values.

The subroutine that has been jumped to is then executed and this subroutine includes an instruction set update instruction indicating that the further instruction set designated by a 4 is to be used. Thus, the instruction set indicator value is set to 4. In response to the return instruction at the end of this subroutine the values from the link register are loaded into the program counter in respect of the return address and the status register in respect of the indicator value, which in this case is a 3.

Figure 6:
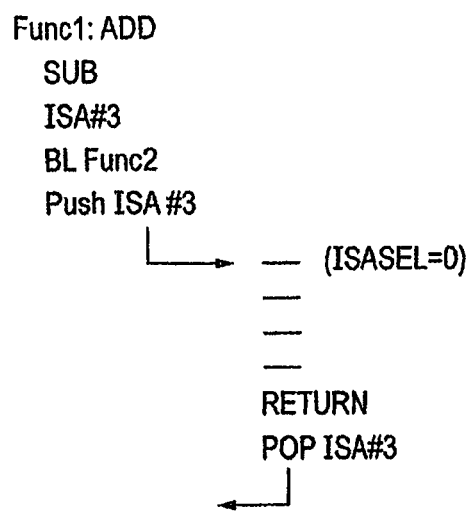
FIG. 6 schematically shows execution of an instruction stream including a branch wherein the return address and values are pushed to a stack.

FIG. 6 schematically shows a branch subroutine in a processing apparatus that does not have branch link registers. In this case, the original instruction stream had set the instruction set indicator value to 3 and thus, in response to the branch instruction this indicator value is pushed to the stack along with the return address. On return from the subroutine the indicator value is popped out of the stack and stored in the status register 70 and the return address is stored in the program counter.

Figure 7:
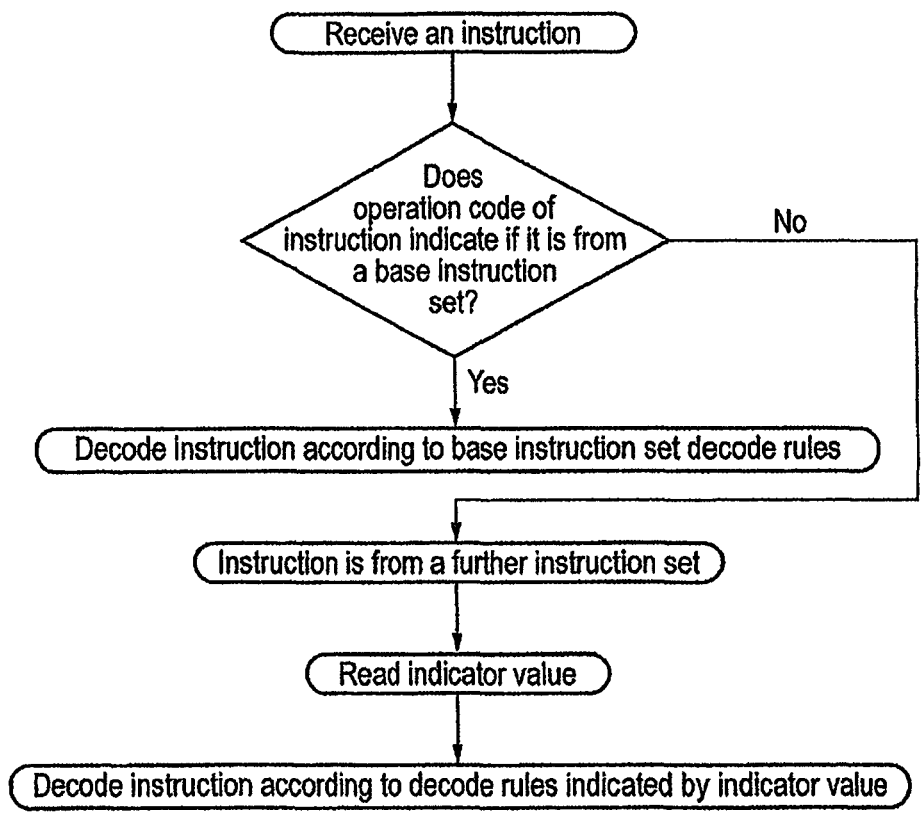
FIG. 7 shows a flow diagram illustrating steps in a method for decoding instructions according to an embodiment of the present invention.

FIG. 7 shows a flow diagram illustrating a method of decoding instructions according to an embodiment of the present invention. An instruction is received at a decoder and the decoder determines from the operation code of the instruction if it is from a base instruction set or not. If it is from the base instruction set then it decodes the instruction according to the base instruction set decode rules. If it is not then it must be from a further instruction set and the decoder reads the indicator value in the status register to determine which further instruction set this instruction comes from. It then decodes the instruction according to the decode rules indicated by this indicator value.

Figure 8:
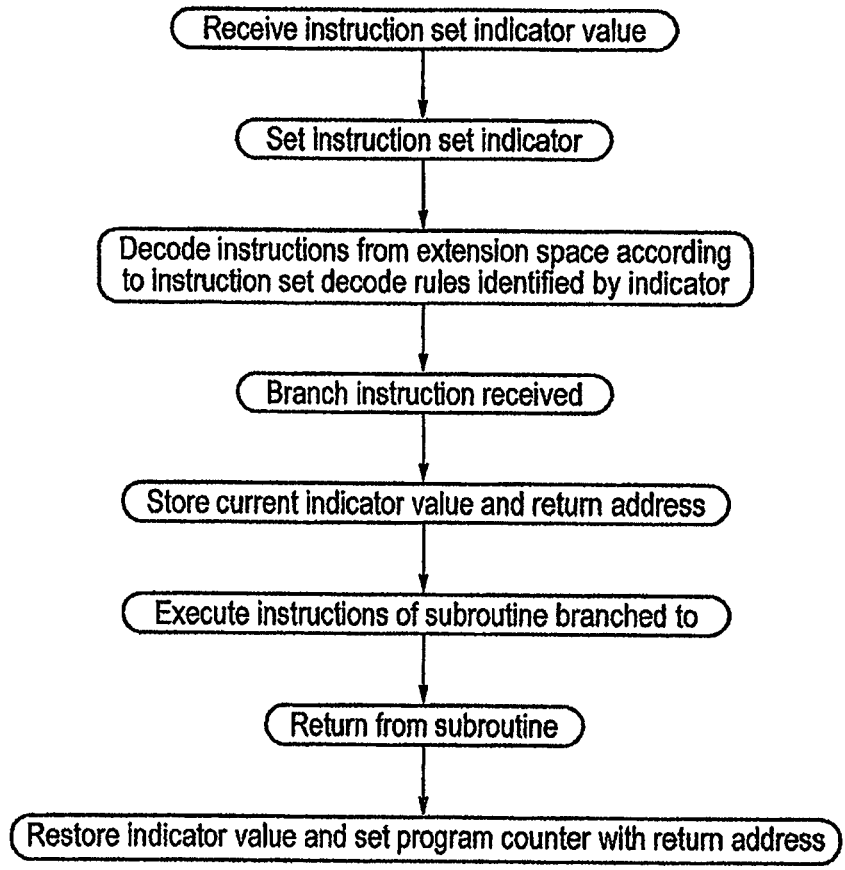
FIG. 8 schematically shows decoding and execution of a stream of instructions including branch instructions according to an embodiment of the present invention.

FIG. 8 indicates steps in a method performed when processing instructions according to an embodiment of the present invention. Initially an instruction set update instruction is received and the indicator value is set in response to this instruction. In response to this indicator value instructions from the further instruction set encoding space are decoded according to decode rules identified by the indicator.

A branch instruction is then received and the current indicator value and the return address are stored. The instruction indicated by the branch is then jumped to and the next instructions are executed. These instructions include an instruction to update the indicator value and thus, the indicator value is updated. When the return from the branch is indicated the indicator value is restored from the stored value to the value it had before the branch and the return address is also retrieved from the store and used to reset the program counter.

Figure 9:
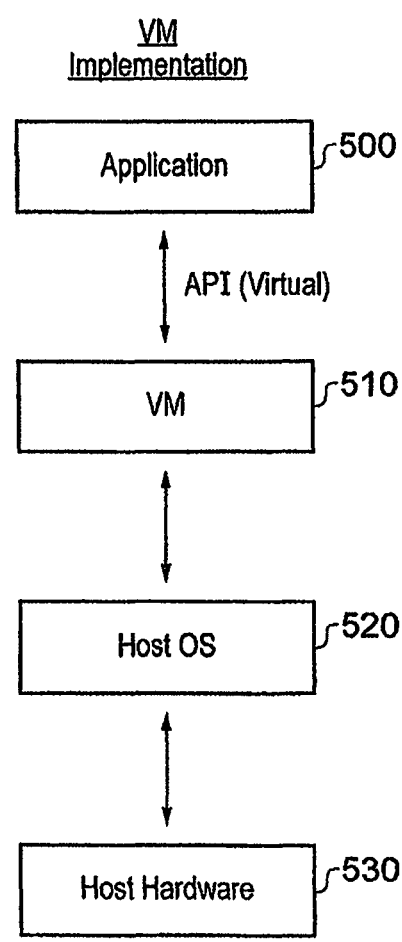
FIG. 9 illustrates a virtual machine implementation of an embodiment of the present invention.

FIG. 9 illustrates a virtual machine implementation that may be used. Whilst the earlier described embodiments implement the present invention in terms of apparatus and methods for operating specific processing hardware supporting the techniques concerned, it is also possible to provide so-called virtual machine implementations of hardware devices. These virtual machine implementations run on a host processor 530 running a host operating system 520 supporting a virtual machine program 510. Typically, large powerful processors are required to provide virtual machine implementations which execute at a reasonable speed, but such an approach may be justified in certain circumstances, such as when there is a desire to run code native to another processor for compatibility or re-use reasons. The virtual machine program 510 provides an application program interface to an application program 500 which is the same as the application program interface which would be provided by the real hardware which is the device being modelled by the virtual machine program 510. Thus, the program instructions, including the control of memory accesses described above, may be executed from within the application program 500 using the virtual machine program 510 to model their interaction with the virtual machine hardware.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. A data processing apparatus comprising:
   an instruction decoder configured to decode instructions; and
   a processor configured to process data in response to instructions decoded by said instruction decoder;
   said instruction decoder being configured to decode instructions from a plurality of different instruction sets, said instruction sets including a base instruction set and at least two further instruction sets;
   said base instruction set comprising a plurality of base instructions, each base instruction comprising a predefined operation code for uniquely identifying said base instruction, and each of said at least two further instruction sets comprising a plurality of further instructions, each further instruction comprising an operation code for identifying said further instruction within said at least two further instruction sets;
   said instruction decoder configured when operational to have access to a base set of decode rules independent of an indicator value, and further to have access to a set of decode rules determined by said indicator value, said indicator value being specified separately to the further instructions of said at least two further instruction sets and indicating which one of said at least two further instruction sets is currently being used in addition to said base instruction set, such that said instruction decoder is configured to decode a base instruction having one of said plurality of predefined operation codes according to said base set of decode rules, and to decode a further instruction having one of said operation codes of said at least two further instruction sets according to said set of decode rules determined by said indicator value,
   wherein each instruction has its operation code specified by a sequence of bits forming an encoding space, the encoding space including a base encoding space and an extension encoding space, and
   wherein said predefined operation codes for base instructions within said base set of instructions lie within the base encoding space and do not lie within the extension encoding space, and said operation codes for further instructions of said at least two further instruction sets lie within the extension encoding space and do not lie within the base encoding space, said indicator value indicating which one of said at least two further instruction sets is currently being represented within said extension encoding space.

2. A data processing apparatus according to claim 1, wherein said at least two further instruction sets have at least some operation codes in common.

3. A data processing apparatus according to claim 1, wherein said data processing apparatus comprises a status register for storing said indicator value.

4. A data processing apparatus according to claim 3, wherein said instruction decoder is responsive to an instruction set update instruction to set said indicator value stored in said status register to a value specified in said instruction set update instruction, said instruction set update instruction being an instruction from said base set of instructions.

5. A data processing apparatus according to claim 1, wherein said processor is configured in response to a branch instruction indicating said program stream is to branch to store a return address and said indicator value such that on return from said branch said return address and indicator value can be restored.

6. A data processing apparatus according to claim 5, wherein said data processing apparatus is configured to reset said indicator value prior to said branch.

7. A data processing apparatus according to claim 5, wherein said return address and indicator value are stored in a same link register.

8. A data processing apparatus according to claim 7, wherein more significant bits of said link register store said indicator value and lower significant bits said return address.

9. A data processing apparatus according to claim 7, wherein said return address and indicator value are stored to a stack in response to said branch and are read from said stack on return from said branch.

10. A data processing apparatus according to claim 1, said instruction decoder being responsive to said indicator indicating one of said at least two further instruction sets and to receipt of an instruction having an operation code for which there is no decode rule within said at least two further instruction sets to generate an exception.

11. A data processing apparatus according to claim 1, said instruction decoder being responsive to detecting said indicator value transitioning to a value indicating a further instruction set for which said instruction decoder has no decode rules to generate an exception.

12. A data processing apparatus according to claim 1, wherein a plurality of different indicator values identify one of said at least two further instruction sets.

13. A method of decoding instructions from different instruction sets, said instruction sets including a base instruction set and at least two further instruction sets, the method comprising:
    receiving an instruction;
    when an operation code of said instruction is an operation code of a base instruction from said base instruction set, decoding said base instruction according to a base set of decode rules accessed independent of an indicator value; and
    when said operation code of said instruction is an operation code of a further instruction from said at least two further instruction sets, decoding said further instruction according to a set of decode rules accessed in dependence on said indicator value, said indicator value being specified separately to the further instructions of said at least two further instruction sets and indicating which one of said at least two further instruction sets is currently being used in addition to said base instruction set,
    wherein each instruction has its operation code specified by a sequence of bits forming an encoding space, the encoding space including a base encoding space and an extension encoding space, and
    wherein said predefined operation codes for base instructions within said base set of instructions lie within the base encoding space and do not lie within the extension encoding space, and said operation codes for further instructions of said at least two further instruction sets lie within the extension encoding space and do not lie within the base encoding space, said indicator value indicating which one of said at least two further instruction sets is currently being represented within said extension encoding space.

14. A method of decoding instructions from different instruction sets according to claim 13 and of processing said decoded instructions, comprising in response to receipt of an instruction set update instruction performing the following steps:
    decoding said instruction set update instruction according to decode rules for said base set of instructions; and
    in response to said decoded instruction set update instruction setting said indicator value in said status register to a value indicated by said decoded instruction.

15. A method according to claim 13, wherein in response to receipt of a branch instruction indicating said program stream is to branch:
    storing a return address and a current value of said indicator such that on return from said branch said return address and indicator value can be restored.

16. A method according to claim 15, wherein said step of storing said return address and indicator value comprises storing said values in a same link register.

17. A method according to claim 15, wherein said step of storing said return address and indicator value comprises storing said values to a stack and in response to a return from branch instruction reading said values from said stack.

18. A method according to claim 13, comprising the step of generating an exception in response to said indicator indicating one of said at least two further instruction sets and to receipt of an instruction having an operation code for which there is no decode rule within said at least two further instruction sets.

19. A method according to claim 13, comprising the step of generating an exception in response to detecting said indicator value transitioning to a value indicating a further instruction set for which said instruction decoder has no decode rules.

20. A non-transitory computer readable storage medium storing a computer program which, when executed upon a computer, provides a virtual machine providing an instruction execution environment for performing the method as claimed in claim 13.

21. A non-transitory computer readable storage medium comprising an instruction set update instruction which when run on a data processor controls said data processor to set an indicator value in a status register to a value indicated by said instruction set update instruction, a decoder of said data processor decoding instructions having operation codes indicating base instructions from a base instruction set according to a base set of decoding rules accessed independent of said indicator value, and decoding further instructions having operation codes indicating instructions from at least two further instruction sets according to a set of decode rules accessed in dependence on said indicator value, said indicator value being specified separately to the further instructions of said at least two further instruction sets and indicating which one of said at least two further instruction sets is currently being used in addition to said base instruction set,
- wherein each instruction has its operation code specified by a sequence of bits forming an encoding space, the encoding space including a base encoding space and an extension encoding space, and
- wherein said predefined operation codes for base instructions within said base set of instructions lie within the base encoding space and do not lie within the extension encoding space, and said operation codes for further instructions of said at least two further instruction sets lie within the extension encoding space and do not lie within the base encoding space, said indicator value indicating which one of said at least two further instruction sets is currently being represented within said extension encoding space.

22. An apparatus for processing data comprising
means for decoding instructions; and
means for processing data in response to instructions decoded by said means for decoding;
said means for decoding being for decoding instructions from a plurality of different instruction sets, said instruction sets including a base instruction set and at least two further instruction sets;
said base instruction set comprising a plurality of base instructions, each base instruction comprising a predefined operation code for uniquely identifying said base instruction, and each of said at least two further instruction sets comprising a plurality of further instructions, each further instruction comprising an operation code for identifying said further instruction within said at least two further instruction sets;
said means for decoding for having access when operational to a base set of decode rules independent of an indicator value, and further for having access to a set of decode rules determined by said indicator value, said indicator value being specified separately to the further instructions of said at least two further instruction sets and indicating which one of said at least two further instruction sets is currently being used in addition to said base instruction set, such that said means for decoding is for decoding a base instruction having one of said plurality of predefined operation codes according to said base set of decode rules, and for decoding further instructions having one of said operation codes of said at least two further instruction sets according to said set of decode rules determined by said indicator value,
- wherein each instruction has its operation code specified by a sequence of bits forming an encoding space, the encoding space including a base encoding space and an extension encoding space, and
- wherein said predefined operation codes for base instructions within said base set of instructions lie within the base encoding space and do not lie within the extension encoding space, and said operation codes for further instructions of said at least two further instruction sets lie within the extension encoding space and do not lie within the base encoding space, said indicator value indicating which one of said at least two further instruction sets is currently being represented within said extension encoding space.

* * * * *